M. SHERMAN & B. RIVKIN.
BRAKE FOR VEHICLES.
APPLICATION FILED MAR. 30, 1914.

1,201,514.

Patented Oct. 17, 1916.

Inventors:
Moses Sherman,
Bert Rivkin,
By their Attorney, A. B. Mattingly.

UNITED STATES PATENT OFFICE.

MOSES SHERMAN AND BERT RIVKIN, OF NEW YORK, N. Y., ASSIGNORS OF ONE-SIXTH TO SELMAN LISS, OF NEW YORK, N. Y., AND ONE-SIXTH TO LEOPOLD TROPP AND ONE-SIXTH TO MORRIS M. TURITZ, BOTH OF BROOKLYN, NEW YORK.

BRAKE FOR VEHICLES.

1,201,514.      Specification of Letters Patent.      Patented Oct. 17, 1916.

Original application filed November 14, 1913, Serial No. 801,013. Divided and this application filed March 30, 1914. Serial No. 828,269.

*To all whom it may concern:*

Be it known that we, MOSES SHERMAN and BERT RIVKIN, citizens of the United States, and residents of New York, in the county of New York and State of New York, have invented certain new and useful Improvements in Brakes for Vehicles, of which the following is a specification.

This invention relates to improvements in brakes for vehicles, and more particularly to positive locks for vehicles, and is adaptable to all styles of wagons, carts, automobiles and so forth, the present application being a division of our application Serial No. 801,013, filed November 14, 1913.

The object of the invention is to provide a simple and inexpensive means for locking a vehicle to prevent the theft thereof.

The further object is to provide a brake of this kind which will prevent one or more of the wheels from revolving and cause them to drag upon the road bed and thus prevent the vehicle from being easily and quickly transferred from one locality to another, and if a theft is being perpetrated the culprit can be easily overtaken and located by the tracks made by the dragging wheels, and the locked wheel of the vehicle will also indicate, if the vehicle is in motion, that a theft is being committed.

The still further object is to provide a brake of this character which cannot be released by any one except he is provided with the proper key, and to prevent dishonest drivers after leaving the employment of a firm from using a duplicate key which they may have made while in charge of the vehicle.

With these and other objects in view, it will be seen that we accomplish the foregoing, by referring to the accompanying drawings forming a part of this specification and showing one of the principal embodiments of our invention, and while we have shown this one principle and the slight modifications, we wish it understood that many other changes may be made in the various parts and arrangement thereof without departing from the spirit and scope of our invention, and we wish to reserve these rights.

Figure 1:
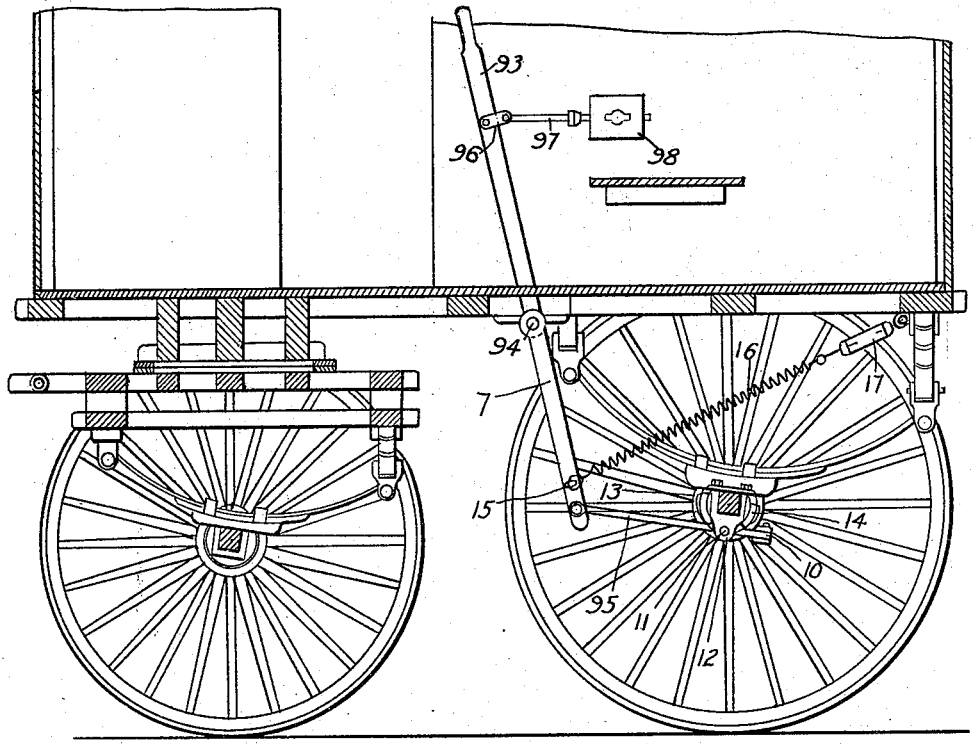
Figure 2:
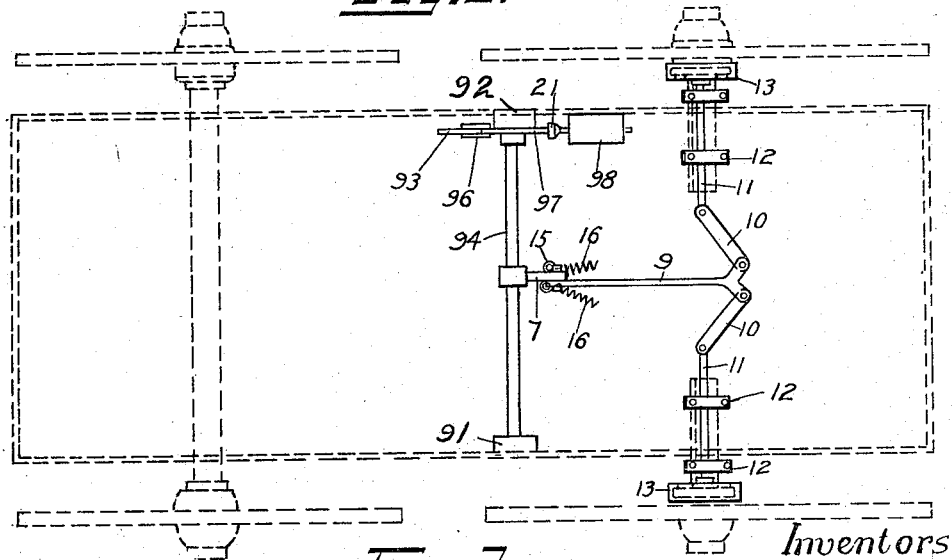

Referring to the accompanying drawings, Figure 1 is a side elevation of one style of delivery wagon partly in section or broken away to more clearly show our invention and how it is applied; and Fig. 2 is a plan of our invention as shown in Fig. 1, a portion of the wagon being shown or indicated by dotted lines.

As shown in the views it will be seen that we provide a brake mechanism for a standard make of wagon. In the present instance the style of wagon is shown such as used for delivering milk or bread in which the driver's seat is at the rear of the wagon. A long lever 7 is shown fast to a cross shaft 94, that may be supported in bearings 91 and 92 on the lower part of the body. The lower end of the lever 7 is pivoted to a rod 9, whose rear end is pivotally connected with a pair of links 10. These links are connected to plungers 11 that slide in supports 12, and the outer end of the plungers enter holes 14 in drums 13 fast to the wheels. When the lever 7 is swung rearward by the driver, at its upper end, the brake shoes will engage the drums and arrest the wagon.

The lever 7 instead of projecting upward into the wagon, may terminate at the shaft 94, and a lever 93 is shown secured to the shaft 94 at one side of the wagon, as indicated in Fig. 2. The upper end of lever 93 is connected by a link 96 with a locking rod 97. The latter when the portion 93 is drawn rearward to engage the brake shoes, will be engaged in the lock 98 to be securely retained therein. This locking means is preferably controlled by a key, and the locking rod cannot be released until the lock is opened by a person having the proper key.

We claim as our invention:

1. The combination with a vehicle, of a pair of plungers mounted to be advanced to engage the wheels, an operating rod, links connecting the plungers with the operating rod, an actuating lever on the vehicle extending up to the body and connected with the operating rod, a key controlled lock device, a rod in the lock device attached to said lever, said lock rod being arranged to be automatically held in the lock on movement of the lever to advance the plungers to engage the wheels, to lock the wheels against movement until the parts are released in the lock on operation of the key.

2. The combination with a vehicle, of a pair of plungers mounted to be advanced to engage the wheels, an operating rod, links connecting the plungers with the rod, a cross shaft on the vehicle, a lever secured to said shaft, a bar connecting said lever with said links to thereby advance the plungers when said shaft is swung to engage the wheels and lock them against movement, an actuating lever secured to said shaft and projecting upward at one side of the body, a rod connected with said lever, and a key controlled locking device arranged to engage said rod and lock it with the plungers advanced to engage the wheels.

Signed at New York, in the county of New York and State of New York, this 24th day of March, A. D. 1914.

MOSES SHERMAN.
BERT RIVKIN.

Witnesses:
M. ROSENHEIM,
A. WOLFF.

Copies of this patent may be obtained for five cents each, by addressing the "Commissioner of Patents, Washington, D. C."